US007117775B2

(12) United States Patent
Broom

(10) Patent No.: US 7,117,775 B2
(45) Date of Patent: Oct. 10, 2006

(54) METHOD AND APPARATUS FOR TRANSFERRING A PAPER WEB

(75) Inventor: Allan Broom, Coquitlam (CA)

(73) Assignee: Voith Paper Patent GmbH, Heindenheim (DE)

( * ) Notice: Subject to any disclaimer, the term of this patent is extended or adjusted under 35 U.S.C. 154(b) by 0 days.

(21) Appl. No.: 10/911,873

(22) Filed: Aug. 5, 2004

(65) Prior Publication Data

US 2005/0005747 A1 Jan. 13, 2005

Related U.S. Application Data

(62) Division of application No. 10/317,802, filed on Dec. 12, 2002.

(51) Int. Cl.
*B26B 3/00* (2006.01)
*G03B 1/56* (2006.01)

(52) U.S. Cl. .................. 83/53; 83/99; 83/177; 83/402; 83/485; 226/91; 226/97.1

(58) Field of Classification Search .................... 83/24, 83/98, 99, 100, 177, 402, 404, 53, 404.1, 83/49, 404.4, 27, 343–345, 485; 162/194, 162/286, 193, 195; 226/7, 91, 92, 97.1, 97.3, 226/97.4, 67.3; 34/117
See application file for complete search history.

(56) References Cited

U.S. PATENT DOCUMENTS 1,595,478 A * 8/1926 Minton ........................ 34/452
1,688,267 A * 10/1928 Cram ......................... 162/193
1,878,184 A * 9/1932 Roesen .................... 242/555.5
3,355,349 A * 11/1967 Devlin ....................... 162/286
3,999,696 A * 12/1976 Reba et al. .................... 226/7
4,022,366 A * 5/1977 Rooney ....................... 226/91
4,501,643 A * 2/1985 Kiuru ......................... 162/286
4,785,696 A * 11/1988 Martiny ....................... 83/152
4,923,567 A * 5/1990 Liedes et al. ............... 162/193
4,945,655 A * 8/1990 Wedel ......................... 34/458
4,997,524 A * 3/1991 Nieminen et al. .......... 162/193

(Continued)

FOREIGN PATENT DOCUMENTS

DE 19962731 6/2001 ................... 15/58

(Continued)

*Primary Examiner*—Boyer D. Ashley
*Assistant Examiner*—Ghassem Alie
(74) *Attorney, Agent, or Firm*—Taylor & Aust. P.C.

(57) ABSTRACT

A method of, and apparatus for, transferring a web, in particular a paper web or cardboard web or an insertion tail severed from the web, from a web-discharging web-guiding surface, via a web conveying apparatus, to the next structural unit of a machine for producing and/or handling the continuous paper web or cardboard web, the insertion tail is detached from the web-guiding surface by way of at least one brief high-energy air jet. The present invention provides that in the case of a web of high grammage, immediately once the tail has been detached from the web-guiding surface, the tail, which has been severed at least on a preliminary basis, is completely severed by an additional mechanical severing arrangement and, by way of its newly formed start, gripped, and passed on, by way of the web conveying apparatus.

4 Claims, 2 Drawing Sheets

U.S. PATENT DOCUMENTS

| | | | | |
|---|---|---|---|---|
| 5,103,703 | A * | 4/1992 | Littleton | 83/155 |
| 5,161,442 | A * | 11/1992 | Rilitz et al. | 83/117 |
| 5,413,017 | A | 5/1995 | Mah | 83/152 |
| 6,394,331 | B1 * | 5/2002 | Haider | 226/91 |
| 6,526,854 | B1 * | 3/2003 | Kytonen et al. | 83/24 |
| 2001/0050300 | A1 * | 12/2001 | Hill et al. | 226/95 |
| 2002/0148874 | A1 * | 10/2002 | Drefs et al. | 226/97.1 |
| 2003/0131943 | A1 * | 7/2003 | Frederisy | 156/538 |
| 2003/0150577 | A1 * | 8/2003 | Broom et al. | 162/193 |
| 2003/0183353 | A1 * | 10/2003 | Helgesson et al. | 162/191 |

FOREIGN PATENT DOCUMENTS

| | | |
|---|---|---|
| DE | 100 31 644 | 1/2002 |
| DE | 100 45 141 | 2/2003 |
| EP | 0359396 | 3/1990 |

* cited by examiner

METHOD AND APPARATUS FOR TRANSFERRING A PAPER WEB

This is a divisional of application Ser. No. 10/317,802 filed Dec. 12, 2002.

BACKGROUND OF THE INVENTION

1. Field of the Invention

The present invention relates to a method of, and an apparatus for, transferring a web, in particular a paper web or an insertion tail, which is part of a continuous paper web.

2. Description of the Related Art

A method, which is described in DE 101 14 613.2, and the associated apparatus make it possible not just to catch the paper web, in particular the tail, from the web-discharging web guiding surface, but, at the same time, also to sever the same transversely. The border nozzles used for this purpose operate pneumatically with high-energy air jets. This method and the apparatus are already suitable for relatively high operating or web speeds and for paper webs of low grammage.

Other references are DE 199 62 731 A1and the "Double Tail Elimination" brochure from the FIBRON Machine Corporation, New Westminster B.C., Canada.

SUMMARY OF THE INVENTION

The present invention provides a method and an apparatus by which it is also possible to transfer paper of relatively high grammage, e.g. packaging paper, at high operating speeds.

The present invention comprises, in one form thereof, transferring a tail from a web-discharging web-guiding surface to a web conveying apparatus, the web or the border tail of the web being detached from the web-guiding surface by way of at least one high-energy air jet and consequently being severed transversely at the same time, with the result that the web or the tail, by way of its newly formed start, is gripped by way of the web conveying apparatus and passed on to the next structural unit of a machine serving for producing and/or handling the web, in particular a papermaking machine.

The provision of an additional mechanical severing arrangement in combination with the pneumatically operating high-energy border nozzles described in DE 101 14 613.2 ensures for the first time that it is also possible for relatively thick paper webs (that is to say paper of relatively high grammage) and/or the insertion tails thereof to be cleanly and quickly severed transversely. This is all the more significant since, in the case of the current machines for producing packaging paper and cardboard, as is similarly the case with the production of graphics paper, relatively high web speeds are required. DE 101 14 613.2 is incorporated herein by reference.

Up until now, the transfer of relatively thick webs from one section of the machine to the next is also very problematic because the severing arrangements used occasionally resulted in a paper jam. The removal of jammed paper took place by hand, which, in turn, was associated with the risk of injury.

The present invention has now made it possible, even at high web speeds, to transfer paper of high grammage such that paper jamming, and the risk of injury, are minimized.

The apparatus according to the present invention functions such that by way of the border nozzles, under the brief high pressure, the web or the tail is detached from the web-discharging surface, for example the last drying cylinder, simultaneously cutting at least on a preliminary basis, and/or perforated and definitively severed transversely by way of the mechanical severing arrangement which, according to the present invention, is arranged in a "concealed" manner and moved into a corresponding position.

A mechanical severing arrangement is known from EP-B1-0554333, in which there are provided blades which rotate in opposite directions to one another and are driven and arranged in one plane. Practical usage of this severing arrangement, however, occasionally resulted in the paper jam explained above along with the negative results specified. As has already been explained above, this is at least largely reduced, if not prevented altogether, by the "concealed"severing arrangement according to the present invention.

A further advantage of the present invention also consists in that it is possible to transfer paper of both low and high grammage by one and the same apparatus according to the present invention. The mechanical severing arrangement is switched on depending on which type of paper is to be produced and/or handled in the papermaking machine. It is also possible for an already installed apparatus with pneumatically acting border nozzles to be retrofitted in a straightforward manner with the concealed mechanical severing arrangement of the present invention.

A further expedient configuration of the present invention consists in providing a further blowing arrangement. Such a blowing arrangement is described in the as yet unpublished DE 100 31 644.1. This additional blowing arrangement can eliminate again to better effect, and more quickly than has been the case hitherto, a so-called double tail formation of the tail or web start in the region of the web-discharging web-guiding surface and of the web conveying apparatus. This result is very important because, as operation of the machine continues, such a double tail can flap around in a very controlled manner, become jammed and results in tears and thus in production losses.

A further blowing arrangement of the present invention emits an air jet of which the speed is temporarily greater than the speed of the tail which is to be transferred or of the web as a whole (in the case of a relatively small web width). In this case, the abovementioned air jet blows in the direction of a pocket-like folded-over section of the tail (double tail) which has formed in an undesirable manner, or is in the process of forming, as transfer commences. The double tail is eliminated again as a result of the jet action, so that the strip or the web can continue again in a straightened-out manner and controlled web transfer is possible. The speed of the air jet is advantageously at least temporarily greater than 1.2 to 3 times the tail or web speed. The air jet is activated in a pulse-like manner during the transfer operation, for which purpose it is possible to use the same compressed-air source that is provided for the border nozzles or else a separate source.

Overall, the apparatus according to the present invention provides a compact arrangement which is used equally well for graphics paper and for packaging paper or cardboard.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
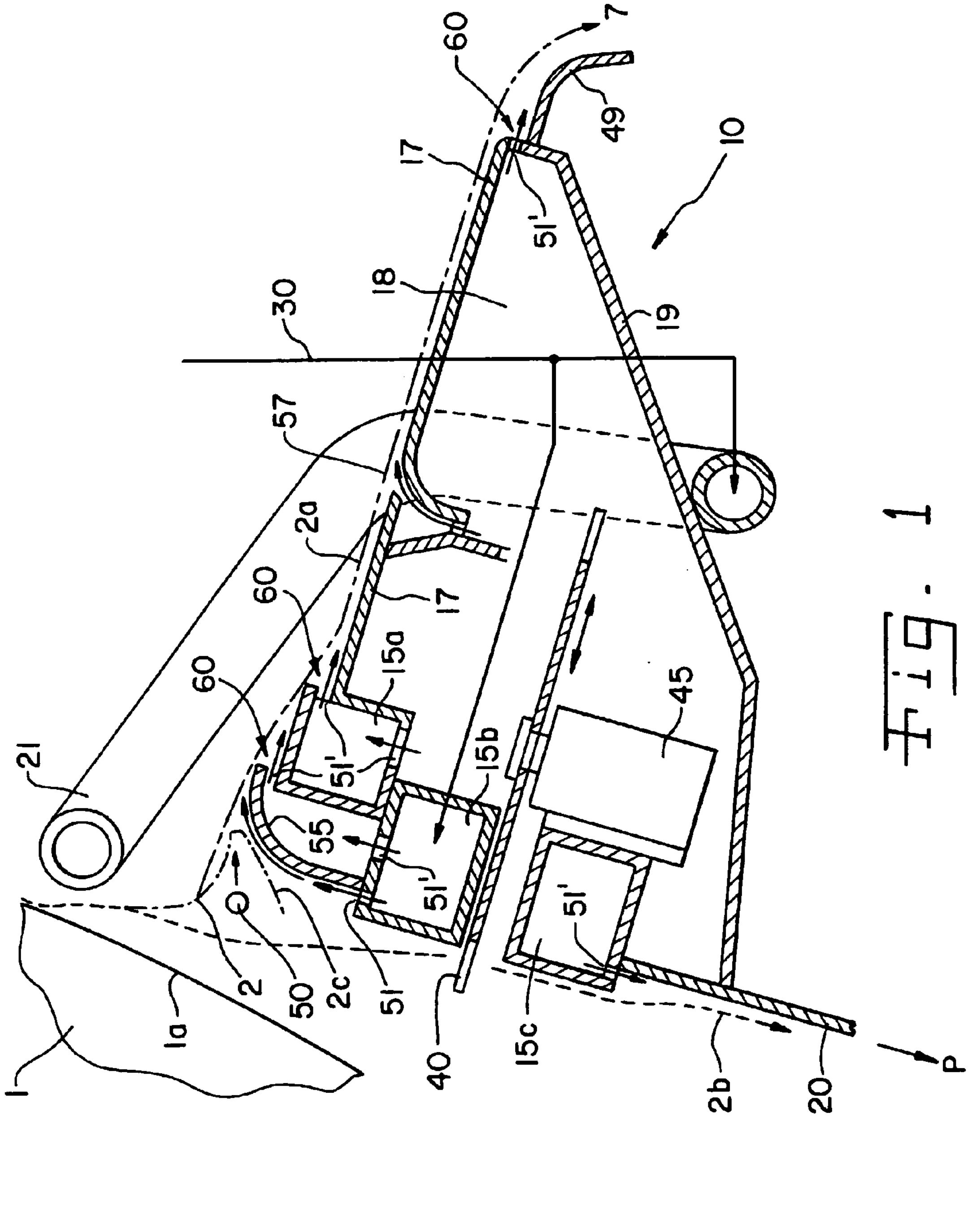
FIG. 1 is a schematic cross-section illustration of the tail-transfer apparatus according to an embodiment of the present invention in the discharging region.

Referring now to the drawings, and more particularly to FIG. 1, there is shown web-discharging web-guiding surface 1*a*, e.g. of the last drying cylinder 1 of a papermaking machine, from which a continuous cardboard web or an insertion tail 2 severed longitudinally from a wide cardboard web of a grammage of approximately 200 g/m2 is transferred to a next handling step 7 (not illustrated).

Cylinder 1 is assigned subassembly 10, a web conveying apparatus, which, in a selected example, includes three high-pressure chambers 15*a*, 15*b*, 15*c* formed from a rectangular hollow profile, and is also assigned guide plate 17 for tail 2*a* (or the web) which is to be transferred, as well as a low-pressure chamber 18 and walls 19, 20 which bound chamber 18. It is either the case that border nozzles 21, assigned to the width of the web or the tail, branch from the top chamber 15*a* or that border nozzles 21, as illustrated in FIG. 1, are activated via a high-pressure line 30. Border nozzles 21 are illustrated in FIG. 1 as a C-shaped tube section and release the tail from cylinder 1 by their brief high-pulse compressed-air jet of 7 to 10 bar, preferably 5 bar. Depending on how high the grammage of the paper is, the tail is also at least perforated or severed on a preliminary basis in the transverse direction at the same time.

Figure 2:
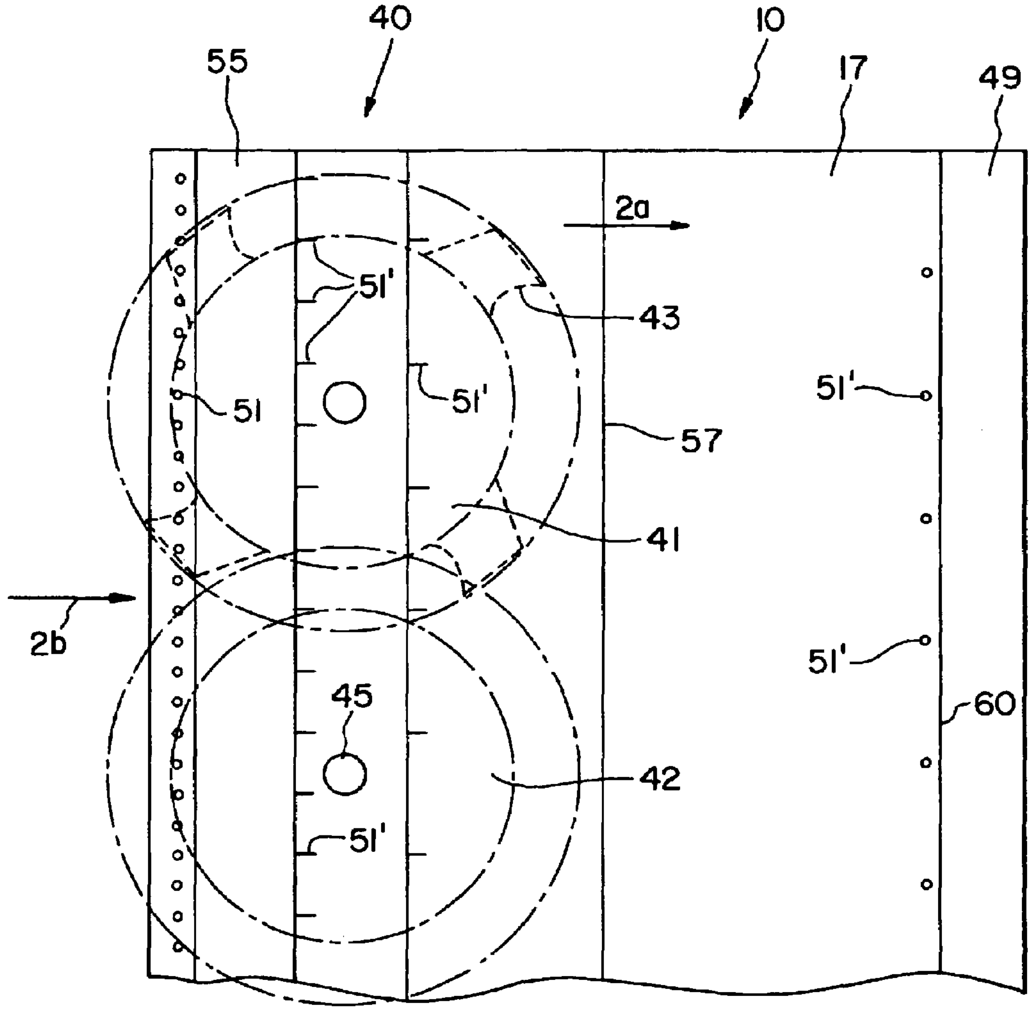
FIG. 2 is a plan view of the apparatus according to an embodiment of the present invention.

A mechanically acting severing arrangement 40 is arranged between two bottom pressure chambers 15*b* and 15*c*. This concealed and protected arrangement protects the operators of the papermaking machine against accidents which may take place on account of the blades which are present. As the double arrow in FIG. 1 shows, severing arrangement 40 is designed such that it can be displaced from a standby position into an operating position and for optional severing. Severing arrangement 40 includes two round blades 41 and 42 which are aligned essentially horizontally in one plane and have cutting edges 43, as is illustrated in FIG. 2.

Blades 41 and 42 are arranged such that they rotate in opposite directions to one another and, in the process, describe mutually overlapping circles. Blades 41 and 42 are each provided with a dedicated drive 45, which is not illustrated in any more detail in the figures but is known per se. Tail 2 which is arriving from the drying cylinder 1, has been detached by the two border nozzles 21 and has possibly been cut at least on a preliminary basis, depending on the grammage of the web, is thus definitively severed transversely quickly and cleanly.

It should be mentioned that suitable drive motors are both high-speed electric motors and air-controlled motors.

Since chamber 15*b* has an upwardly directed blowing opening 51 and a rounded, upwardly directed guide wall 55, a negative pressure is produced by the known Coanda effect in the region of wall 55, the negative pressure feeding the new start of tail 2*a* to guide plates 17, and the tail being passed from here to the receiving region (not illustrated) of a following machine section 7.

It is also very advantageous if, for this purpose, a further, so-called Coanda nozzle 57, which is configured approximately like nozzle 51, is arranged within guide plate 17. As a result, the tail or a narrow web as a whole is transferred in a flat state without flapping.

It is often the case in the current high-speed machines (mostly operating over 2000 m/min) that a so-called undesired double tail 2*c* forms. This is a start of the tail (or web) which folds over in a pocket-like manner, or in other words, is a pocket-like folded-over start or section. Double tail 2*c* is eliminated, and it is passed on in a flat state, by an additional blowing arrangement, which in the embodiment shown is blowing-air nozzle 50. The blowing air is thus oriented directly into pocket 2*c*.

During the transfer operation, the blowing speed is approximately 1.2 to 3 times the web speed. As the compressed-air source it is likewise possible to utilize line 30, or else an additional compressed-air line (not illustrated in the figures) is provided.

Further blowing openings 51' are provided in chambers 15*a–c* and in chamber 18 in order, on the one hand, to allow the transfer of tail 2*a* over steps 60 and a curved directing surface 49 and, on the other hand, to direct the severed part 2*b* satisfactorily downwards, along the wall 20, into pulper P.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of transferring a continuous web of a machine for at least one of producing and handling the web, comprising the steps of:

detaching the tail from a web-discharging web-guiding surface with at least one brief high-energy air jet;

providing a low-pressure chamber connected to said web-discharging web-guiding surface, and at least one high-pressure chamber located adjacent said low-pressure chamber;

rotating an additional mechanical severing arrangement including a first rotating blade driven in a first blade rotation and a second rotating blade driven in a second blade rotation;

completely severing the tail, in the case of a web of high grammage, by said mechanical severing arrangement;

facilitating a movement of a cut web with said at least one high-pressure chamber;

locating a dedicated drive of said mechanical severing arrangement within said low-pressure chamber; and transferring the web from said web-discharging web-guiding surface via a web conveying apparatus to a next structural unit.

2. The method of claim 1, wherein the insertion tail is cut, at least on a preliminary basis, by said high-energy air jet, said severing step is coordinated in time with an operation of at least one said high-energy jet resulting in said severing step at least immediately follows commencement of an operation of said air jet in said detaching step.

3. The method of claim 1, further including a blowing step following said severing step, said blowing step avoiding a new tail start folding over in a pocket-like manner, said blowing step using an additional blowing arrangement.

4. The method of claim 1, wherein said continuous web is one of a paper web, a cardboard web and an insertion tail which is part of the continuous web.

* * * * *

UNITED STATES PATENT AND TRADEMARK OFFICE

CERTIFICATE OF CORRECTION

PATENT NO. : 7,117,775 B2
APPLICATION NO. : 10/911873
DATED : October 10, 2006
INVENTOR(S) : Broom It is certified that error appears in the above-identified patent and that said Letters Patent is hereby corrected as shown below:

COLUMN 4

At lines 15 and 16, please delete “1 5a-c”, and substitute therefore --15a-c--.

Signed and Sealed this

Tenth Day of July, 2007

JON W. DUDAS

*Director of the United States Patent and Trademark Office*